United States Patent
Lee et al.

(10) Patent No.: US 9,737,268 B1
(45) Date of Patent: Aug. 22, 2017

(54) FACILITATING NAVIGATION DATA UPDATES

(75) Inventors: Woojae Lee, Manhattan, KS (US); Sanjay K. Sharma, Olathe, KS (US); Peter S. Syromiatnikov, Overland Park, KS (US); Cesar Perez, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1447 days.

(21) Appl. No.: 12/711,933

(22) Filed: Feb. 24, 2010

(51) Int. Cl.
*G01C 21/26* (2006.01)
*A61B 5/00* (2006.01)
*G08B 21/02* (2006.01)
*G06F 19/00* (2011.01)
*G08G 1/14* (2006.01)
*A61B 5/07* (2006.01)

(52) U.S. Cl.
CPC .......... *A61B 5/746* (2013.01); *G06F 19/3418* (2013.01); *G08B 21/02* (2013.01); *G08G 1/144* (2013.01); *A61B 5/07* (2013.01)

(58) Field of Classification Search
CPC ................ B65H 18/28; B65H 2511/40; B65H 2553/612; B65H 2557/13; B65H 2557/50
USPC .......................................................... 701/201
See application file for complete search history.

(56) References Cited

U.S. PATENT DOCUMENTS

| | | | | |
|---|---|---|---|---|
| 7,835,859 | B2* | 11/2010 | Bill .............................. | 701/424 |
| 2004/0117113 | A1* | 6/2004 | Friedrichs et al. ........... | 701/210 |
| 2007/0156334 | A1* | 7/2007 | Vu ..................... | G01C 21/3415 701/416 |
| 2007/0179709 | A1* | 8/2007 | Doyle .......................... | 701/209 |
| 2008/0109162 | A1* | 5/2008 | Chen et al. .................. | 701/210 |
| 2010/0030466 | A1* | 2/2010 | Rogers .............. | G01C 21/3415 701/533 |
| 2010/0312466 | A1* | 12/2010 | Katzer et al. ................. | 701/201 |

OTHER PUBLICATIONS

Bradbury, Jody Neil. The integration of city models and GNSS for the simulation and modeling of multipath and availability: Paving the way for new applications. University of London, University College London (United Kingdom), ProQuest Dissertations Publishing, 2008. U592526.*

* cited by examiner

*Primary Examiner* — F. Zeender
*Assistant Examiner* — Fawaad Haider

(57) ABSTRACT

A method, system, and medium are provided for facilitating navigation data updates. One embodiment of the method includes receiving an indication that a navigation route is unavailable. The indication that the navigation route is unavailable is provided by a user of a mobile device. A notification of the unavailable navigation route is communicated to a navigation server. The unavailable navigation route is excluded in subsequently provided navigation routes.

15 Claims, 4 Drawing Sheets

FACILITATING NAVIGATION DATA UPDATES

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first aspect, a set of computer-useable instructions provide a method of facilitating navigation data updates. The method includes receiving an indication that a navigation route is unavailable. The indication that the navigation route is unavailable is provided by a user of a mobile device. A notification of the unavailable navigation route is communicated to a navigation server. The unavailable navigation route is excluded in subsequently provided navigation routes.

In a second aspect, a set of computer-useable instructions provide a method of facilitating navigation data updates. The method includes receiving an indication provided by a user of a mobile device that a first navigation route is unavailable. A request is received for a navigation route from a beginning point to an ending point. Incident to the request for the navigation route from the beginning point to the ending point, a second navigation route is provided that excludes use of the first navigation route in accordance with the indication that the first navigation route is unavailable.

In another aspect, a set of computer-useable instructions provide a method of facilitating navigation data updates. The method includes providing a first navigation route to a first mobile device having a navigation application in response to a request for a navigation route from a first beginning location to a first ending location. It is recognized that a portion of the first navigation route is unavailable in accordance with an indication provided by a user of the first mobile device that the portion of the first navigation route is unavailable. A request is received for a navigation route from a second beginning location to a second ending location, the request being received from a second mobile device having a navigation application. In response to the request for the navigation route from the second beginning point to the second ending point, a second navigation route is provided that excludes use of the portion of the first navigation route based on the recognition that the portion of the first navigation route is unavailable. It is recognized that the portion of the first navigation route is available. In response to a request for a navigation route from a third beginning point to a third ending point, a third navigation route is provided that uses the portion of the first navigation route recognized as available.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
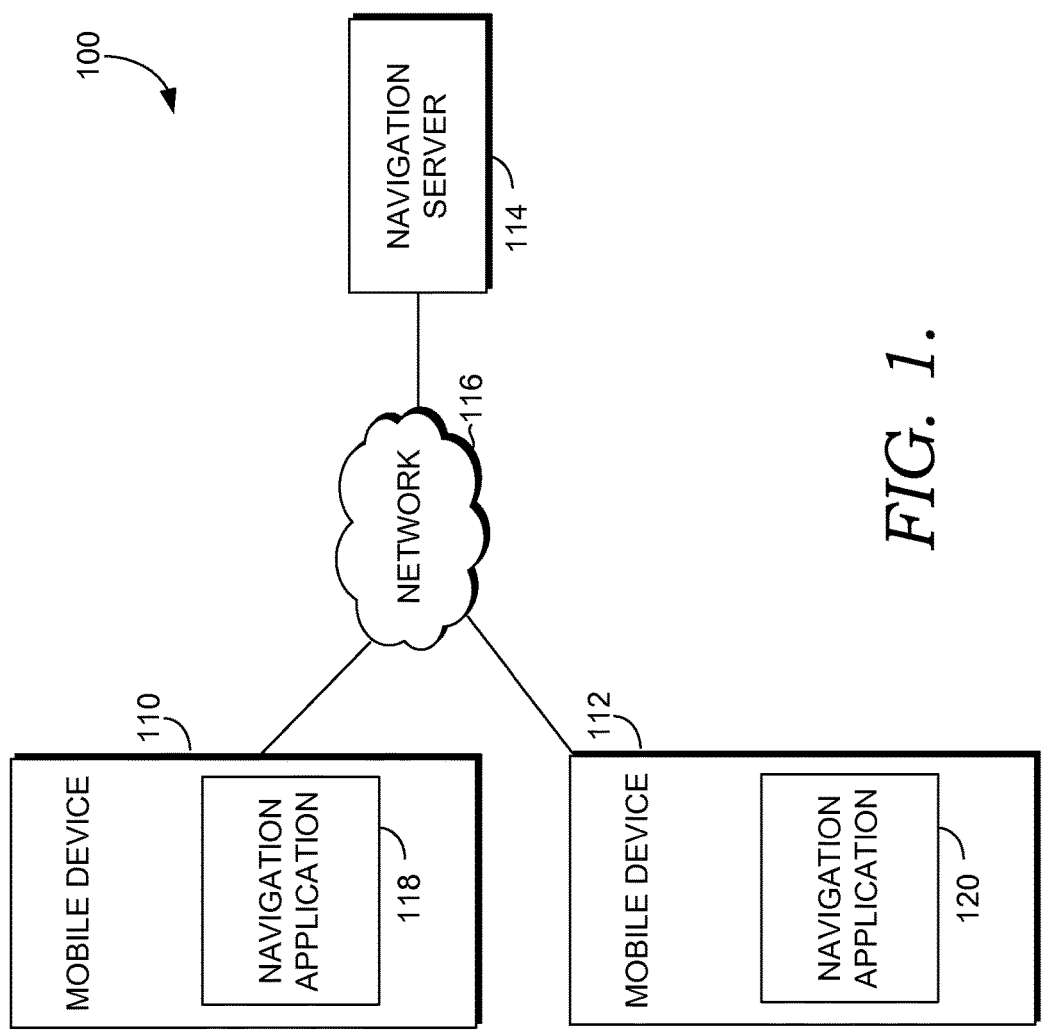
FIG. 1 is a block diagram of an exemplary computing system 100 that is suitable for operation of an embodiment of the present invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended for the purpose of providing an easy methodology of communicating the ideas expressed herein and are not meant to limit the scope of the present invention. The following is a list of these acronyms:

3G Third-Generation Wireless Telephone Technology
4G Fourth-Generation Wireless Telephone Technology
CDMA Code Division Multiple Access
CD-ROM Compact Disk Read Only Memory
DVD Digital Versatile Discs
EEPROM Electrically Erasable Programmable Read Only Memory
GPRS General Packet Radio Service
GPS Global Positioning System
GSM Global System for Mobile Communications
iDEN Integrated Digital Enhanced Network
ISP Internet Service Provider
PC Personal Computer
PCS Personal Communications Service
PDA Personal Digital Assistant
RAM Random Access Memory
ROM Read Only Memory
TDMA Time Division Multiple Access
WiMAX Worldwide Interoperability for Microwave Access Further, various technical terms are used throughout this description. An illustrative resource that fleshes out various aspects of these terms can be found in Newton's Telecom Dictionary by H. Newton, 24$^{th}$ Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention are directed to updating navigation data. Navigation data, as used herein, refers to any data used by a navigation application, or computing device (e.g., a server or a mobile device) in association therewith, to generate and/or provide navigation routes to one or more users. By way of example, and not limitation, navigation data might include, an available route(s), an unavailable route(s), a route condition(s), traffic data, etc. As used herein, a navigation route refers to any route or course for passage or travel. In embodiments, a route includes a set of roads, streets, highways, and interstates that can be used for travel. In this regard, a navigation route can be an entire route or a portion of a route proposed to a user in accordance with a specified start location and/or destination location. By way of example only, assume that a user requests directions, via a navigation application, from Overland Park, Kans. to Chicago, Ill. Further assume that a proposed route includes directions that include the use of Interstate 35, among other interstates, highways, and streets. In such a case, a navigation route might be considered the entire course provided from Overland Park, Kans. to Chicago, Ill. Alternatively or additionally, a navigation route might be considered a portion of the course of travel, such as, for example, the Interstate 35 portion of the course or a portion of Interstate 35.

In some cases, a route, or a portion thereof, might be unavailable for travel. That is, in some cases, a navigation route provided to a user (i.e., via a navigation application) might be closed or unusable. In this regard, a route might be unavailable for travel due to road construction, a road condition (e.g., icy, flooded, etc.), an accident, a safety precaution (e.g., a chemical spill, a fire, a high-speed chase), traffic flow, or any other reason. In such cases, updating navigation data with such route unavailability data enables other travelers (e.g., other navigation application users) to be notified of unavailable routes and/or provided with navigation routes that exclude the unavailable route.

Referring to the drawings generally, and initially to FIG. 1 in particular, an exemplary computing system 100 for practicing an embodiment of the present invention is provided. It will be understood and appreciated by those of ordinary skill in the art that the computing system 100 shown in FIG. 1 is merely an example of one suitable computing system and is not intended to suggest any limitation as to the scope of use or functionality of the present invention. Neither should the computing system 100 be interpreted as having any dependency or requirement related to any single component or combination of components illustrated therein. The single unit depictions are meant for clarity, not to limit the scope of embodiments in any form.

As shown in FIG. 1, an exemplary computing system 100 includes a mobile device 110, a mobile device 112, and a navigation server 114. Mobile device 110, mobile device 112, and navigation server 114 are capable of communicating via a communications network(s), such as network 116. Network 116 might comprise, for example, a cable network, the Internet, a wireless network (e.g., a wireless telecommunications network), or a combination thereof or portions thereof. A wireless telecommunications network refers to any type of telecommunications network that is wireless. Examples of a wireless telecommunications technologies that are compatible with the network 116 include, but are not limited to, Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PCS).

In embodiments, network 116 includes an array of devices, which are not shown so as to not obscure more relevant aspects of the invention. Components such as a base station, a communications tower, or even access points (as well as other components) can provide wireless connectivity in some embodiments. Communications network 116 may be a single network or can include multiple networks, as well as being a network of networks, but is shown in more simple form so as to not obscure other aspects of the present invention. In this regard, although FIG. 1 illustrates mobile device 110 and mobile device 112 communicating with the navigation server 114 via a single network 116, multiple networks can be used. For instance, mobile device 110 might be associated with a 3G network (i.e., a 3G mobile device) while mobile device 112 might be associated with a 4G network (i.e., a 4G mobile device). In such a case, the mobile device 110 communicates with the navigation server 114 via a 3G mobile data network and the mobile device 112 communicates with the navigation server 114 via a 4G mobile data network.

Network 116 enables communication between mobile device 110, mobile device 112, and navigation server 114. In one embodiment, network 116 comprises a wireless telecommunications network provided by a telecommunications network provider, such as, for example, Sprint®, AT&T®, etc. Alternatively or additionally, in another embodiment, network 116 comprises the Internet. In such a case, a device, such as a landline computing device, can communicate with the navigation server 114 via an ISP (Internet Service Provider) associated with the Internet. In this regard, network 116 can comprise a wireless network and/or a physically wired network, such as a landline, Ethernet, or the like.

The mobile device 110 can be any electronic device having a navigation application. As such, mobile device 110 may take on a variety of forms, such as a personal computer (PC), a laptop computer, a mobile phone, a personal digital assistant (PDA), or any other device that utilizes a navigation application as described herein. Makers of illustrative devices include, for example, Research in Motion, Creative Technologies Corp., Samsung, Apple Computer, and the like. A mobile device can include, for example, a display(s), a power source(s) (e.g., a battery), a data store(s), a speaker(s), memory, a buffer(s), and the like. In embodiments, a mobile device comprises a wireless or mobile device with which a wireless telecommunications network is utilized for communication. Although illustrated as a mobile device, as can be appreciated, in other embodiments, a stationary device or a mobile device (e.g., a landline laptop) can be used with which a network, such as the Internet and/or landline, is utilized for communication.

The mobile device 110 includes a navigation application 118. A navigation application refers to an application that facilitates generating and/or providing navigation routes to a user(s). In embodiments, a navigation application residing on mobile device 110 communicates with the navigation server 114 to generate and/or provide navigation routes to a user. In this regard, the navigation application residing on mobile device 110 and/or the navigation server 114 can generate and/or provide navigation routes to a user. In some cases, the navigation application 118 obtains navigation data from the navigation server 114 and, thereafter, generates and provides a navigation route(s) for a user. In other cases, the navigation server 114 generates a navigation route(s) and communicates the navigation route(s) to the navigation application 118 on the mobile device 110 for display to the user.

In one embodiment, a navigation application can be a web application accessed via a web browser that communicates with the navigation server 114. Exemplary web-based navigation applications include mapping services provided by Mapquest.com® and Google Maps™. In alternative embodiments, a navigation application executes on a device, such as a mobile device, in association with an operating system of the device and accesses the navigation server 114.

A navigation route can be generated and/or provided in response to or incident to an indicated source location and/or destination location for which directions are desired. Alternatively or additionally, a navigation route can be generated and/or provided based on an indication of a map display. For example, assume a user desires to view a map of traffic of the Kansas City Metropolitan. In such a case, a particular route from a source location to a destination location is not specified. Rather, the user might wish to view traffic flow on various routes within the Kansas City Metropolitan area. Accordingly, a navigation application might display, via a user interface, a plurality of navigation routes in response to an indication to view the map of the Kansas City Metropolitan area. As can be appreciated, a navigation route might be provided to a user in the form of a visual map display, for example, a route from a source location to a destination location drawn or otherwise visually indicated within the context of a map. Alternatively or additionally, a navigation route might be provided to a user in text form or audio form. That is, text, in written form or audio form, can be provided to the user to indicate a navigation route.

An indication or a request to view a navigation route, such as a request to view a map or a request to view a route from a source location to a destination location, can be provided by a user via a user interface on the mobile device 110. The navigation application 118 receives the indication or request and, in response thereto, generates and/or provides a navigation route. As previously mentioned, the navigation application 118 might generate and/or provide a navigation route(s) in association with the navigation server 114. That is, the navigation application 118 communicates with the navigation server 114 to obtain navigation data to generate and/or provide a navigation route.

The navigation application 118, in some embodiments, is configured to allow a user to report an unavailable route. An unavailable route, as used herein, refers to a navigation route that is not available for travel. A navigation route might be unavailable for any reason, such as, for example, road construction, road conditions, traffic, traffic accidents, or other emergencies (e.g., high-speed chase, chemical spill, file, etc.). In some cases, an unavailable route is indicated upon a user recognizing that a route is unavailable (i.e., user-initiated). For example, assume that a user is provided with a Route A to arrive at a particular destination. Further assume that the user traveling on Route A approaches a portion of the route, Route B, that is unavailable for transportation. In such a case, the user can report the unavailable Route B via the navigation application 118 on the mobile device 110.

In other cases, an indication or report of an unavailable route is initiated by the navigation application 118. In this regard, the navigation application 118 recognizes (e.g., via a GPS system) that the user is not following a navigation route initially provided to the user. Accordingly, the navigation application 118 might inquire as to the reason for deviating from the navigation route provided to the user. The inquiry regarding travel deviation might allow the user to input or select a reason for varying travel path or, alternatively, may request the user to confirm or deny that the user's travel deviation is due to an unavailable route. As can be appreciated, in some embodiments, upon recognizing deviation from a navigation route, the navigation application 118 might automatically generate and provide a report indicating an unavailable route without requesting user feedback or confirmation.

As previously mentioned, the navigation server 114 communicates with the mobile device 110 and the mobile device 112 via the network 116. In embodiments, the navigation server 114 is associated with a network application provider (i.e., the provider of the network application). As can be appreciated, a navigation application provider might be a wireless telecommunications provider, or an entity in association therewith (e.g., in a contract with a telecommunications provider), a website service provider, or any other provider of a navigation application.

The navigation server 114 facilitates updating navigation data. In embodiments, the navigation server 114 is configured to recognize unavailable routes. As previously discussed, unavailable routes can be reported by users (e.g., user-initiated or navigation application initiated) of navigation applications operating on devices, such as mobile device 110. Accordingly, the navigation server 114 can recognize unavailable routes based on indications or reports of unavailable routes received by or retrieved from user devices having navigation applications. A report or indication of an unavailable route can contain any pertinent information including, for example, a beginning location of a route, an ending location of a route, a beginning location of an unavailable route, an ending location of an unavailable route, a time and/or date in association with an unavailable route, a reason for an unavailable route, and/or the like.

Additionally or alternatively, in some cases, unavailable routes are recognized by the navigation server 114 based on a lack of utilization of a particular navigation route. In this regard, the navigation server 114 might infer that a particular route is unavailable. As unavailable navigation routes may be automatically reported (i.e., without user intervention) by a navigation application operating on a user device upon recognizing deviation from an initially provided route, the navigation server 114 might infer that a particular route is unavailable. For example, assume that a user of a first device having a navigation application deviates from a Route 1, and a user of a second device having a navigation application also deviates from Route 1. Further assume that both navigation applications report such deviations from Route 1 to a navigation server. Upon receiving the reports, the navigation provider can make an inference that Route 1 is unavailable. In other cases, the navigation server 114 might recognize that a particular route is not traveled, for example, via a GPS or satellite system. In such cases, the navigation server 114 can infer that such a route is unavailable.

In one embodiment, the navigation server 114 is configured to recognize unavailable routes upon exceeding a predetermined threshold. For instance, a threshold might be utilized to minimize an effect of false reports or inaccurate or minimal unavailability detection. By way of example only, assume that unavailability of a route is recognized based on reports provided by users via navigation applications on mobile devices (e.g., a report initiated by the user or initiated upon recognition of route deviation). In such a case, the navigation server 114 might only recognize a particular route as unavailable upon receiving or retrieving a particular number of reports indicating an unavailable route. That is, the navigation server 114 recognizes a route as unavailable upon identifying a particular number of unavailable route reports that exceeds an unavailability report threshold. In another example, assume that unavailability of a route is recognized based on travel deviations from a particular route. In such a case, the navigation server 114 might only recognize a route as unavailable upon identifying a predetermined number of deviations from a particular route. Accordingly, the navigation server 114 recognizes a route as unavailable upon identifying a particular number of route deviations that exceeds a deviation amount threshold. In yet another example, assume that unavailability of a route is recognized based on travel deviations occurring over a predetermined time period (i.e., a deviation duration threshold). That is, for example, if a route has limited traffic over a predetermined time period (e.g., five minutes), the navigation server 114 recognizes that the route is unavailable.

Upon recognizing unavailable routes, navigation data is updated to incorporate new or more accurate information regarding route unavailability. As can be appreciated, updated navigation data can be stored, for example, in a data store in association with the navigation server 114, the mobile device 110, and/or the mobile device 112. The navigation server 114 utilizes the navigation data to provide updated navigation data to users of devices having navigation applications. In embodiments, the updated navigation data is utilized to facilitate subsequent routing. In this regard, an unavailable route can be omitted (e.g., temporarily excluded) such that a selected navigation route provided to a user prevents the user from being directed to an unavailable route. In cases where the navigation server 114 generates a route to provide to a navigation application in association with a device, the navigation data pertaining to unavailable routes is used in identifying or selecting a route for a user or set of users. The selected route that avoids the unavailable route can then be communicated to the navigation application on a device requesting a route for display to the user. In cases where the navigation application 118 of a device generates a route to provide to the user, the navigation data pertaining to unavailable routes is communicated to one or more devices such that the navigation applications on the respective devices can utilize such information to generate appropriate routes (i.e., routes that avoid the unavailable routes).

Additionally or alternatively to providing a route that avoids unavailable routes, an indication of any unavailable route(s) can be provided. As such, in some cases, a listing of any unavailable routes might be provided to a user via a navigation application. In other cases, unavailable routes might be indicated in association with a proposed route (e.g., a map route or a text route) such that the user is informed of the reason for the particular proposed route.

As can be appreciated, updated navigation data can be used in association with any device having a navigation application. In some embodiments, updated navigation data is used in association with any device having a navigation application in communication with a navigation server, such as navigation server 114. In this regard, the mobile device 110 that provided unavailable route data, the mobile device 112, or any other device in communication with the navigation server 114 can benefit from use of the updated navigation data (e.g., unavailable route data).

The mobile device 112 can facilitate detection of route availability. The mobile device 112 can be any electronic device that facilitates detection of route availability. As such, mobile device 112 may take on a variety of forms, such as a personal computer (PC), a laptop computer, a mobile phone, a personal digital assistant (PDA), or any other device. Makers of illustrative devices include, for example, Research in Motion, Creative Technologies Corp., Samsung, Apple Computer, and the like. A mobile device 112 can include, for example, a display(s), a power source(s) (e.g., a battery), a data store(s), a speaker(s), memory, a buffer(s), and the like. In embodiments, a mobile device 112 comprises a wireless or mobile device with which a wireless telecommunications network is utilized for communication. Although illustrated as a mobile device 112, as can be appreciated, in other embodiments, a mobile or stationary device (e.g., a landline laptop) can be used with which a network, such as the Internet and/or landline, is utilized for communication.

In embodiments, the mobile device 112 also includes a navigation application 120, as described above. The navigation application 120, in some embodiments, is configured to allow a user to indicate or report an available route. An available route, as used herein, refers to a navigation route that is available for travel. In some cases, an available route might be reported upon a user recognizing that a route is available (e.g., after unavailability of the route). For example, assume that a user is provided with a Route A to arrive at a particular destination. Further assume that the user traveling on Route A approaches a portion of the route, Route B, that is available for transportation. In such a case, the user can report the available Route B via the navigation application 120 on the mobile device 112.

In other cases, a report of an available route might be initiated by the navigation application 120. In this regard, the navigation application 120 might recognize (e.g., via a GPS system) that the user is commuting on a route previously indicated as unavailable. Accordingly, the navigation application 120 inquires as to availability of the route. The inquiry regarding route availability might allow the user to input or select a reason for route availability, may request the user to confirm or deny route availability, or the like. Such route availability data can be communicated to the navigation server 114.

The navigation server 114 is configured to recognize available routes. As previously discussed, available routes can be reported by devices, such as mobile device 112. Accordingly, navigation server 114 can recognize available routes based on reports or indications received by or retrieved from user devices having navigation applications. As previously discussed, such reports can be generated based on a user initiation to report an available route or a navigation application initiation in accordance with route usage. As can be appreciated, a report or indication of an available route can contain any pertinent information including, for example, a beginning location of a route, an ending location of a route, a beginning location of an available route, an ending location of an available route, a time and/or date in association with the available route, a reason for the available route, and/or the like.

Additionally or alternatively, in some cases, available routes are recognized by the navigation server 114 based on utilization of a particular navigation route. In this regard, the navigation server 114 might recognize that users of devices having a navigation application are using a particular route and thereby infer that a particular route is available. In other cases, a navigation server 114 might recognize that a particular route is being traveled, for example, via a GPS or satellite system. In such cases, the navigation server 114 can infer that such a route is available without the use of mobile device 112 or any other devices in communication with the navigation server 114.

In one embodiment, the navigation server 114 is configured to recognize available routes upon exceeding a predetermined threshold. For instance, a threshold might be utilized to minimize an effect of false reports or inaccurate or minimal detection. By way of example only, assume that route availability is recognized based on reports provided by a user via a navigation application on a mobile device (e.g., a user initiated report or application initiated report). In such a case, the navigation server 114 might only recognize a route as available upon receiving or retrieving a particular number of reports indicating an available route. That is, the navigation server 114 recognizes a route as available upon identifying a particular number of available route reports that exceeds an availability report threshold. In another example, assume that route availability is recognized based on usage of a particular route. In such a case, the navigation server 114 might only recognize a route as available upon identifying a particular number of usages of a particular route or a particular amount of time of usage of a particular route. Accordingly, the navigation server 114 recognizes a route as available upon identifying a particular number of route usages that exceeds a usage amount threshold or upon identifying a time duration of usage that exceeds a usage duration threshold.

Upon recognizing available routes, the navigation data is updated to incorporate new or more accurate information regarding route availability. As can be appreciated, updated navigation data can be stored, for example, in a data store in association with the navigation server 114, the mobile device 110, and/or the mobile device 112. The navigation server 114 utilizes the updated navigation data in subsequent routing. In this regard, an available route can be utilized to generate or select a navigation route for a user or set of users. In cases where the navigation server 114 generates a route to provide to a navigation application in association with a device, the navigation data pertaining to available routes is used in identifying or selecting a route for a user or set of users. In cases where the navigation application 120 generates a route to provide to the user, the navigation data pertaining to available routes is communicated to one or more devices such that the navigation applications on the respective devices can utilize such information to generate appropriate routes.

Figure 2:
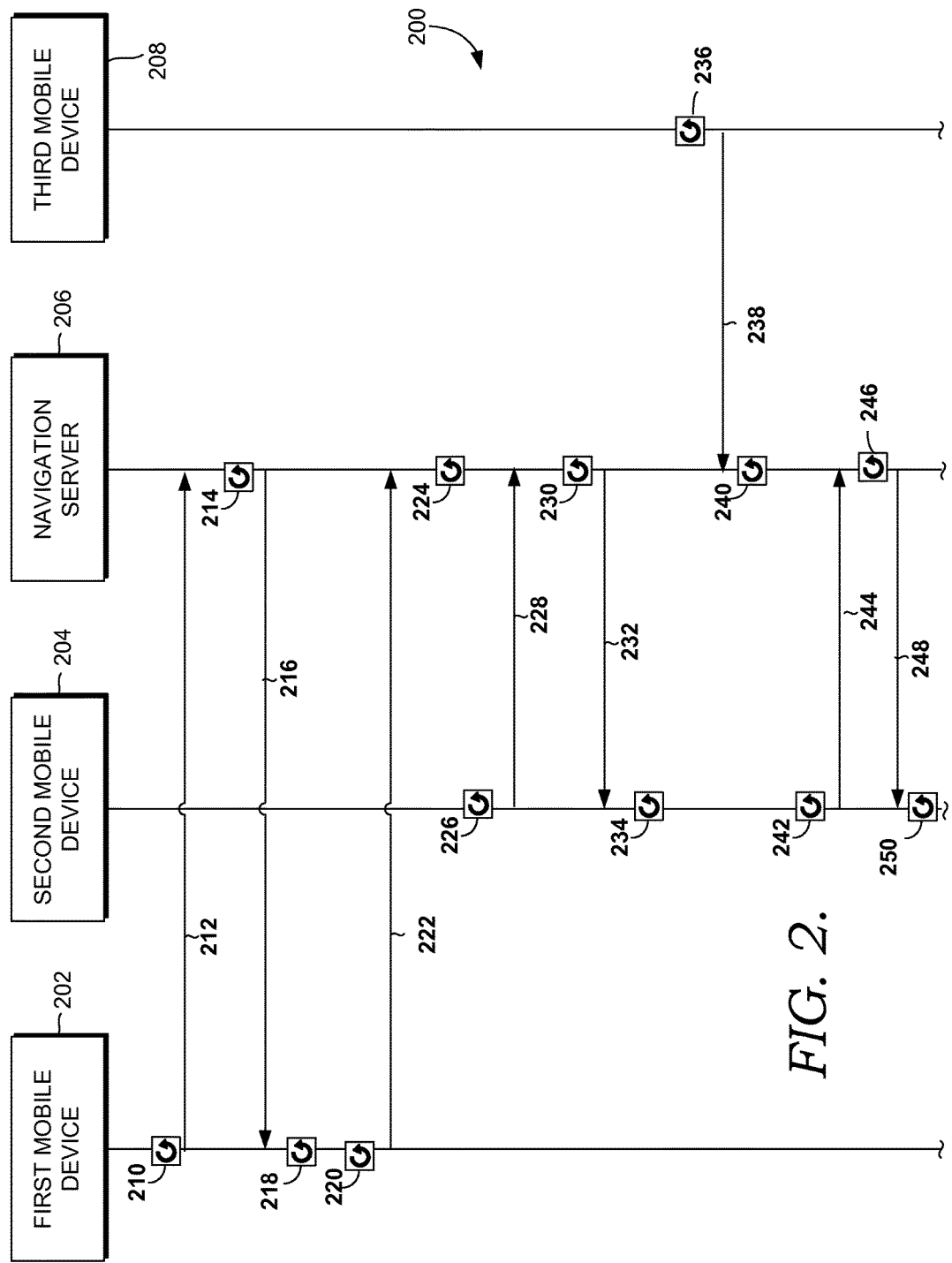
FIG. 2 provides an exemplary flow diagram illustrating a method for updating navigation data, in accordance with an embodiment of the present invention.

By way of example only, and with reference to FIG. 2, an exemplary flow diagram illustrating a method for updating navigation data is generally depicted by numeral 200. The flow diagram includes a first mobile device having a navigation application, generally depicted by numeral 202; a second mobile device having a navigation application, generally depicted by numeral 204; a navigation server, generally depicted by numeral 206; and a third mobile device having a navigation application, generally depicted by numeral 208. Each of the first mobile device 202, the second mobile device 204, and the third mobile device 208 are in communication with the navigation server 206.

Initially assume that, at block 210, the first mobile device 202 receives user input indicating a request to obtain a navigation route from beginning location A to ending location B. A request for a navigation route is communicated 212 to the navigation server 206. Upon receiving the request, at block 214, a Route 1 extending from beginning location A to ending location B is generated. The Route 1 is provided 216 to the first mobile device 202, and the first mobile device 202 displays Route 1, as indicated at block 218.

Now assume that the user of the first mobile device 202 begins to follow Route 1 as provided and approaches a portion of the route, Route 1z, that is unavailable for travel. As such, an indication that the Route 1z is unavailable is provided. As can be appreciated, the user can initiate the indication of unavailability via the navigation application or, upon deviating from the Route 1z, the navigation application might initiate the indication of unavailability. The indication of unavailability of Route 1z is received at block 220. Data regarding the unavailability of Route 1z is communicated 222 to the navigation server 206. At block 224, the navigation data is updated to reflect the unavailability of Route 1z.

At a time after updating the navigation data, assume that the second mobile device 204 receives user input indicating a request to obtain a navigation route from beginning location A to ending location B, or any other route including Route 1z, as indicated at block 226. A request for a navigation route is communicated 228 to the navigation server 206. Upon receiving the request, at block 230, a Route 2 extending from beginning location A to ending location B is generated. The navigation server 206 utilizes the unavailability data corresponding with Route 1z to generate a new route, Route 2, for travel. As can be appreciated, in one embodiment, updated navigation data, such as route unavailability data, is referenced prior to generating a route such that unavailable routes are considered in generating routes (e.g., routes based on a shortest time or a shortest distance). In another embodiment, a route is determined, for example, based on a shortest distance or a shortest time from beginning location A to ending location B. Upon determining a selected route, it is identified that such a route includes an unavailable portion (e.g., Route 1z). In accordance therewith, another route that avoids use of the unavailable portion (e.g., Route 1z) is determined. Returning to FIG. 2, Route 2 is provided 232 to the second mobile device 204, and the second mobile device 204 displays Route 2, as indicated at block 234.

Now assume that the third mobile device 208 is used to detect travel that is resumed on Route 1z, as indicated at block 236. For example, availability of Route 1z is detected for the route previously reported to be unavailable. In embodiments, availability of routes can be recognized based on a GPS, a user-provided indication, or the like. In some cases, route availability can be detected based on route usage irrespective of whether such usage includes mobile devices and navigation application associated therewith. Availability of Route 1z is reported 238 to navigation server 206. At block 240, the navigation data is updated to reflect the resumed availability of Route 1z.

Thereafter, assume that second mobile device 204 again receives user input indicating a request to obtain a navigation route from beginning location A to ending location B, or any other route including Route 1z, as indicated at block 242. A request for a navigation route is communicated 244 to the navigation server 206. Upon receiving the request, at block 246, Route 1 extending from beginning location A to ending location B is generated. The navigation server 206 utilizes the updated navigation data reflecting the resumed availability of Route 1z to identify Route 1 as available for travel. In some cases, Route 1 is identified as a preferred route (e.g., shortest distance route or shortest time route) and no portion of Route 1 is identified as unavailable, as indicated in the updated navigation data. Route 1 is provided 248 to the second mobile device 204, and the second mobile device 204 displays Route 1, as indicated at block 250.

Figure 3:
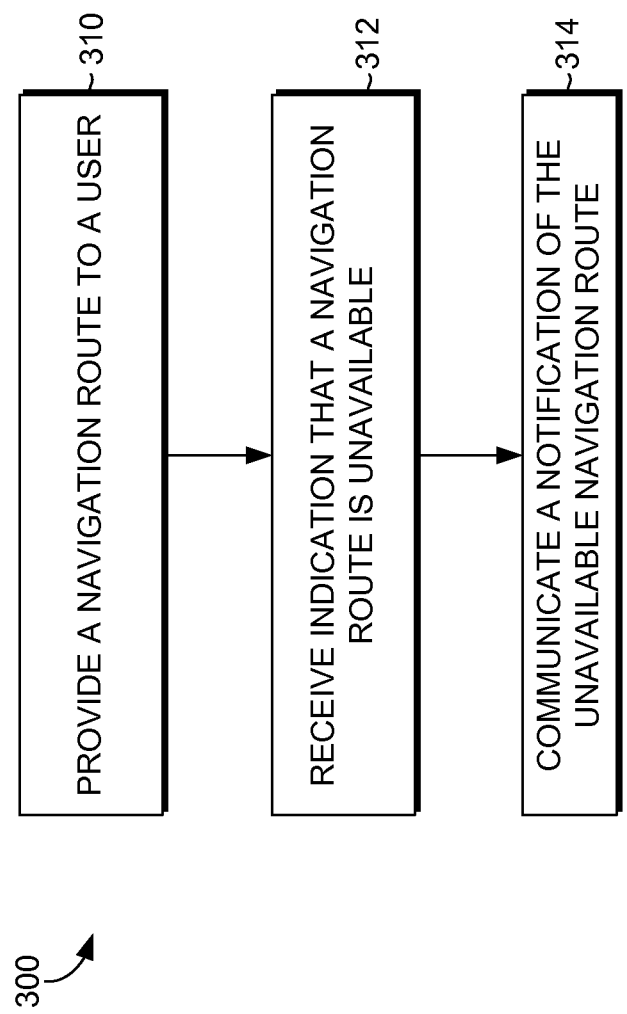
FIG. 3 illustrates a first exemplary method for facilitating navigation updates, in accordance with an embodiment of the present invention.

Referring now to FIG. 3, an exemplary method for facilitating navigation updates is provided. Initially, as indicated at block 310, a navigation route is provided to a user. A navigation route is provided to a user via a navigation application in association with a user device, such as a mobile device. At block 312, an indication that a navigation route is unavailable is received. In embodiments, the indication is provided by the user of the device. A notification of the unavailable navigation route is communicated to a navigation server. This is indicated at block 314. The unavailable navigation route is excluded in subsequently provided navigation routes. For example, any route that would generally be provided (e.g., a shortest time route, a shortest distance route, etc.) and that includes the unavailable navigation route is modified to avoid the unavailable navigation route.

Figure 4:
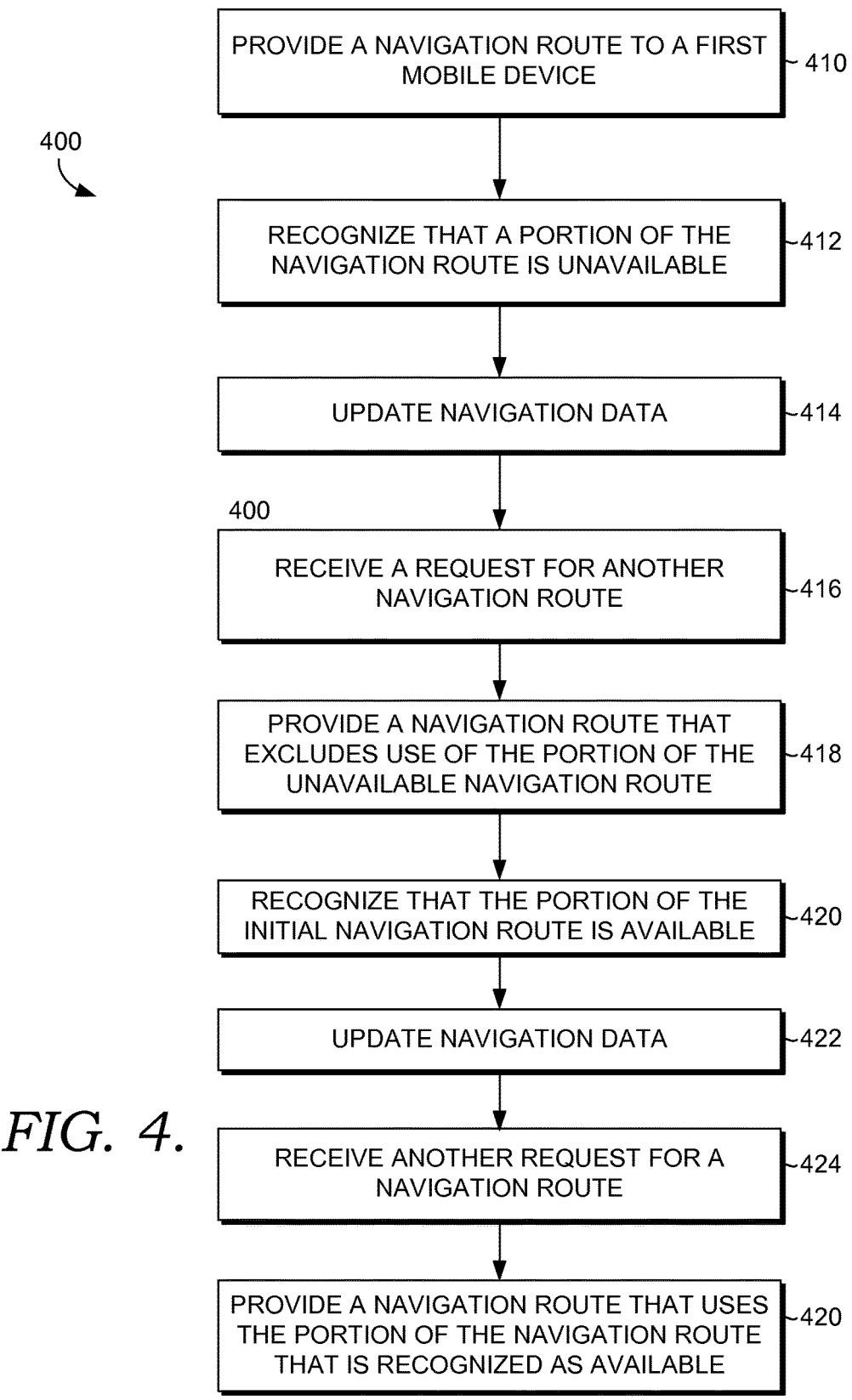
FIG. 4 illustrates a second exemplary method for facilitating navigation updates, in accordance with an embodiment of the present invention.

Turning to FIG. 4, an exemplary method for facilitating navigation updates is provided. Initially, as indicated at block 410, a navigation route is provided to a first mobile device having a navigation application. The navigation route is provided in response to a request for a navigation route from a first beginning location to a first ending location. At block 412, it is recognized that a portion of the navigation route is unavailable. In one embodiment, such recognition occurs in accordance with an indication provided by a user of the first mobile device that the portion of the navigation route is unavailable. Navigation data is updated at block 414 to reflect the portion of the navigation route that is unavailable. At block 416, a request for a navigation route from a second beginning location to a second ending location is received. In embodiments, the request is received from a second mobile device having a navigation application. Subsequently, at block 418, a navigation route that excludes use of the portion of the navigation route that is unavailable is provided. Although such a navigation route might generally include use of the unavailable navigation route, an updated navigation route is proposed in accordance with the data indicating the unavailable portion of the navigation route. At a later time, it is recognized that the portion of the initial navigation route is again available. This is indicated at block 420. In embodiments, availability of a navigation route might be detected by a device, such as a mobile device having a navigation application, a navigation server, a GPS, or a combination thereof. Navigation data is updated at block 422 to reflect the availability of the portion of the navigation route. At block 424, another request for a navigation route is received. A navigation route is provided that uses the portion of the navigation route that is recognized as available, as indicated at block 426.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need be carried out or need to be carried out in the specific order described.

The invention claimed is:

1. One or more non-transitory computer-readable media having computer-useable instructions embodied thereon for performing a method of facilitating navigation data updates, the method comprising:
   a navigation application for:
      providing a navigation route to a user of the first mobile device, the navigation route provided as a path or a portion thereof for traveling from a beginning location to an ending location;
      using location information of the first mobile device, recognizing that the first mobile device deviates from a first portion of the navigation route, wherein the deviation indicates that the first portion is not followed by the user of the first mobile device;
      based on the recognition of the first mobile device deviating from the first portion of the navigation route, providing an option for user selection or confirmation that at least the first portion of the navigation route is unavailable, the option for user section or confirmation provided for communication to the user via the first mobile device;
      receiving an indication provided by the user via the first mobile device that confirms the at least the first portion of the navigation route is unavailable;
      communicating a notification of the at least the first portion of the navigation route that is unavailable to a navigation server, the at least the first portion of the navigation route that is confirmed unavailable being excluded in subsequently provided navigation routes provided to other mobile devices utilizing the navigation application;
      subsequently receiving, from a second mobile device using the navigation application, a second notification indicating that the at least the first portion of the navigation route, which was previously confirmed to be unavailable by the user of the first mobile device, is available for including in subsequently provided navigation routes; and
      communicating, to the navigation server, a third notification of the at least the first portion indicated as available in the second notification, the at least the first portion being included in navigation routes subsequently provided to other mobile devices utilizing the navigation application.

2. The media of claim 1, wherein the indication that the first portion of the navigation route is unavailable is initiated by the user upon the user recognizing that the first portion of the navigation route provided is unavailable.

3. The media of claim 1, wherein a navigation route comprises a complete route or course for passage or travel from a beginning location to an ending location.

4. The media of claim 1, wherein the first portion of the navigation route is unavailable due to a road condition, a traffic flow, an emergency situation, or a road construction.

5. The media of claim 1, wherein the subsequently provided navigation routes are provided to users of mobile devices having navigation applications in communication with the navigation server.

6. One or more non-transitory computer-readable media having computer-useable instructions embodied thereon for performing a method of facilitating navigation data updates, the method comprising:
   at a server in communication with a navigation application:
      receiving a first indication provided by the navigation application of one or more mobile devices that a first navigation route is deviated from;

identifying a first portion of the first navigation route that was not used based on the first indication, wherein a deviation from the first navigation route was used in lieu of the first portion;

determining that the first portion of the first navigation route is unavailable based on receiving a predetermined number of indications that the first portion of the first navigation route has been deviated from, the indications received from the one or more mobile devices;

receiving a request for a navigation route from a beginning point to an ending point;

incident to the request for the navigation route from the beginning point to the ending point, providing a second navigation route from the beginning point to the ending point that excludes use of the first portion of the first navigation route in accordance with the determination that the first portion of the first navigation route is unavailable;

subsequently receiving, from the navigation application, a second indication that indicates use of the first portion, the first portion previously determined to be unavailable and for which the deviation from the first navigation was used in lieu of;

based on receipt of the second indication that indicates use of the first portion, determining that the first portion of the first navigation route has resumed availability for use in subsequently providing navigation routes; and when a request for another navigation route is received, providing the another navigation route that includes the first portion of the navigation route having resumed availability.

7. The media of claim 6, wherein the first indication provided by the navigation application is based on an inability of a user to travel on at least the first portion of the first navigation route.

8. The media of claim 6, wherein the first indication that the first navigation route is deviated from is provided via a navigation application operating on a mobile device.

9. The media of claim 8, wherein the navigation application is a web application.

10. The media of claim 8, wherein the navigation application resides on the one or more mobile device in association with an operating system of the one or more mobile device.

11. The media of claim 9, wherein the request for the navigation route from the beginning point to the ending point is provided by another mobile device after the first portion is determined to be unavailable based on the predetermined number of indications.

12. The media of claim 6 further comprising recognizing that at least the first portion of the first navigation route is unavailable.

13. One or more non-transitory computer-readable media having computer-useable instructions embodied thereon for performing a method of facilitating navigation data updates, the method comprising:

via a navigation server:

providing a first navigation route to a first mobile device having a navigation application, the first navigation route provided in response to a user-initiated request for a navigation route from a first beginning location to a first ending location;

recognizing that a first portion of the first navigation route is unavailable based on an indication provided by a user of the first mobile device that a deviation is used in lieu of the first portion of the first navigation route, wherein the indication includes location information of the first device, the location information corresponding to the deviation used in lieu of the first portion;

receiving a request for a navigation route from a second beginning location to a second ending location, the request being received from a second mobile device having a navigation application;

subsequent to recognizing the first portion is unavailable and in response to the request from the second mobile device for the navigation route from the second beginning point to the second ending point, providing a second navigation route to the second mobile device, wherein the second navigation route excludes use of the first portion of the first navigation route based on the recognition that the first portion of the first navigation route is unavailable and that the deviation was used in lieu of the first portion;

subsequent to recognizing the first portion is unavailable, recognizing that the first portion has resumed availability based on an indication provided by a user of a third mobile device that the first portion was used and is accessible; and when a request for a navigation route from a third beginning point to a third ending point is received subsequent to recognizing the first portion has resumed availability, providing a third navigation route that includes the first portion of the first navigation route.

14. The media of claim 13 further comprising detecting usage of the first portion of the first navigation route.

15. The media of claim 13, wherein the use of the first portion of the first navigation route is identified based on a user-provided indication.

* * * * *